United States Patent [19] [11] 4,032,712
Catto et al. [45] June 28, 1977

[54] TELEPHONE ANSWERING DEVICE WITH SEPARATE ANNOUNCEMENT ERASE AND PLAYBACK CONTROL TIMING PERIODS

[75] Inventors: Kenneth A. Catto; Harold R. Burt, both of Beauertum, Oreg.

[73] Assignee: Data Time, Inc., Portland, Oreg.

[22] Filed: Apr. 25, 1975

[21] Appl. No.: 571,808

Related U.S. Application Data

[60] Continuation of Ser. No. 408,641, Oct. 23, 1973, abandoned, which is a division of Ser. No. 308,970, Nov. 24, 1972, Pat. No. 3,833,186.

[52] U.S. Cl. .................. 179/6 R; 179/100.1 VC; 360/66; 360/71; 360/74
[51] Int. Cl.² .................. H04M 1/64; G11B 15/02
[58] Field of Search .................. 360/66, 74, 71; 179/6 R, 6 E, 6 AC, 6 C, 100.1 VC, 1 VC

[56] References Cited

UNITED STATES PATENTS 3,787,625  1/1974  Sato ................................ 179/6 R
3,935,389  1/1976  Waldman ........................... 179/6 E

*Primary Examiner*—Raymond F. Cardillo, Jr.

*Attorney, Agent, or Firm*—Kolisch, Hartwell, Dickinson & Stuart

[57] ABSTRACT

Disclosed herein is an automatic telephone answering device having an announcement tape deck for recording an announcement and for reproducing it in response to an incoming call. Circuitry including a syllabic detector and an announcement timer in the device provides different operating times in the deck's two different operating modes. In an announcement record mode, the deck is electrically deactuated a predetermined time period following the end of the announcement being recorded, i.e., after the absence of speech signals for the predetermined time. However, when operating in an announcement reproduce or playout mode, the deck is deactuated a different, shorter period of time following the end of the announcement on the tape. The longer deactivation period is provided after recording an announcement to insure that a sufficient portion of any previously recorded, longer announcement on the tape will be erased past the point where the deck is deactuated during announcement reproduction. This guarantees that no portion of an old announcement will be inadvertently played out to a caller.

2 Claims, 6 Drawing Figures

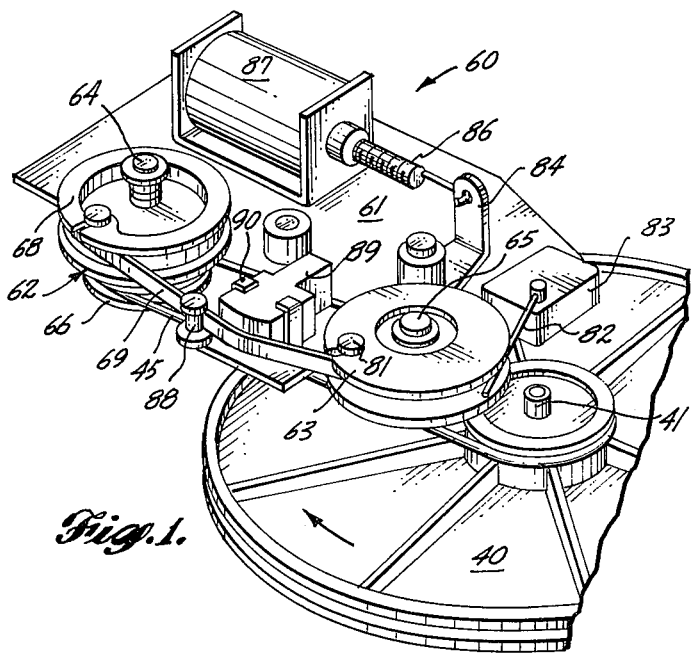
Fig.1.
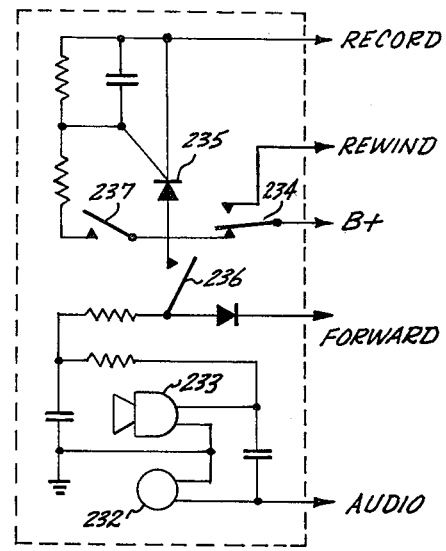
Fig.5.
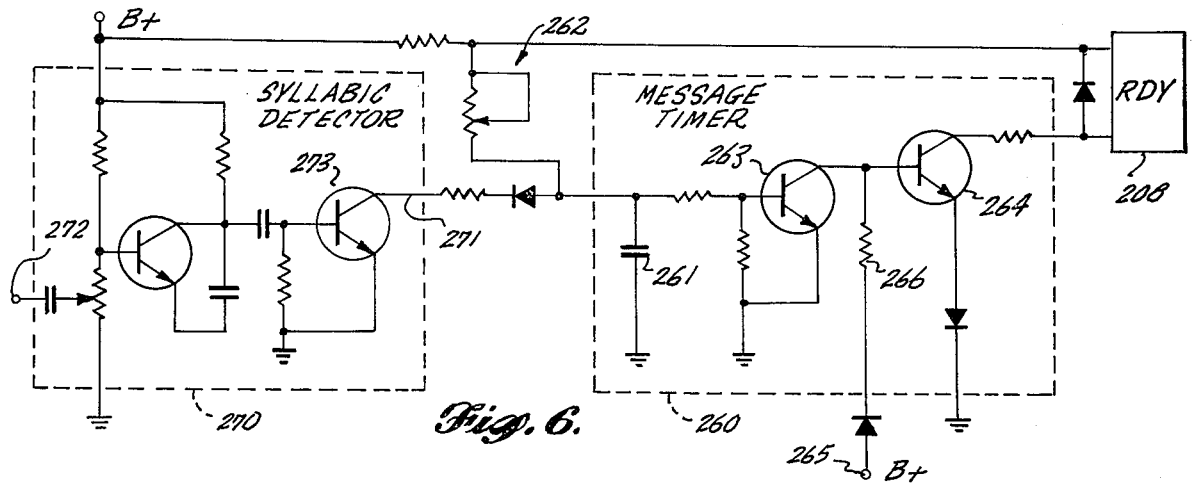
Fig.6.
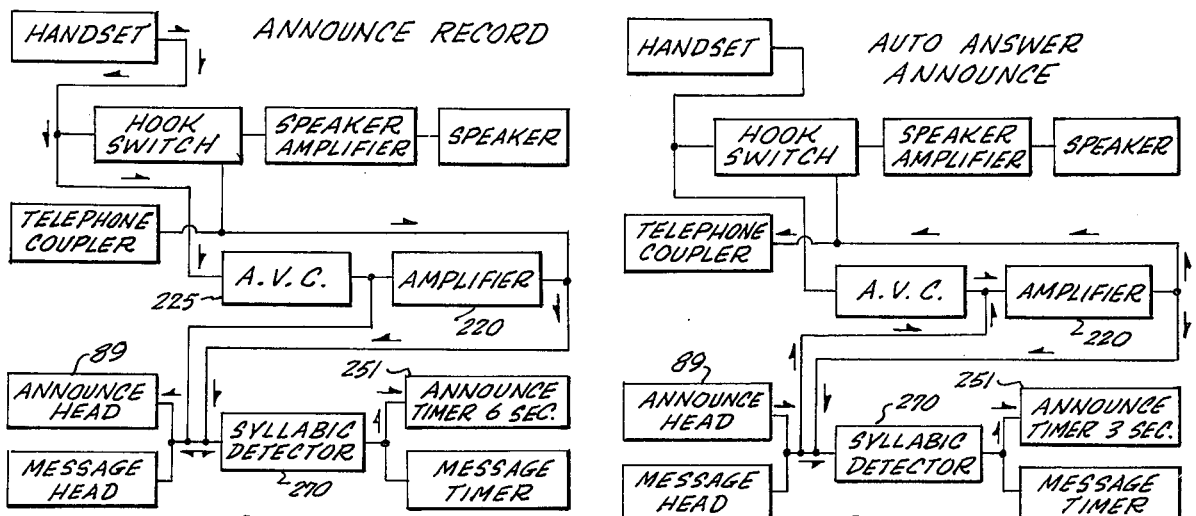
Fig.2.
Fig.3.

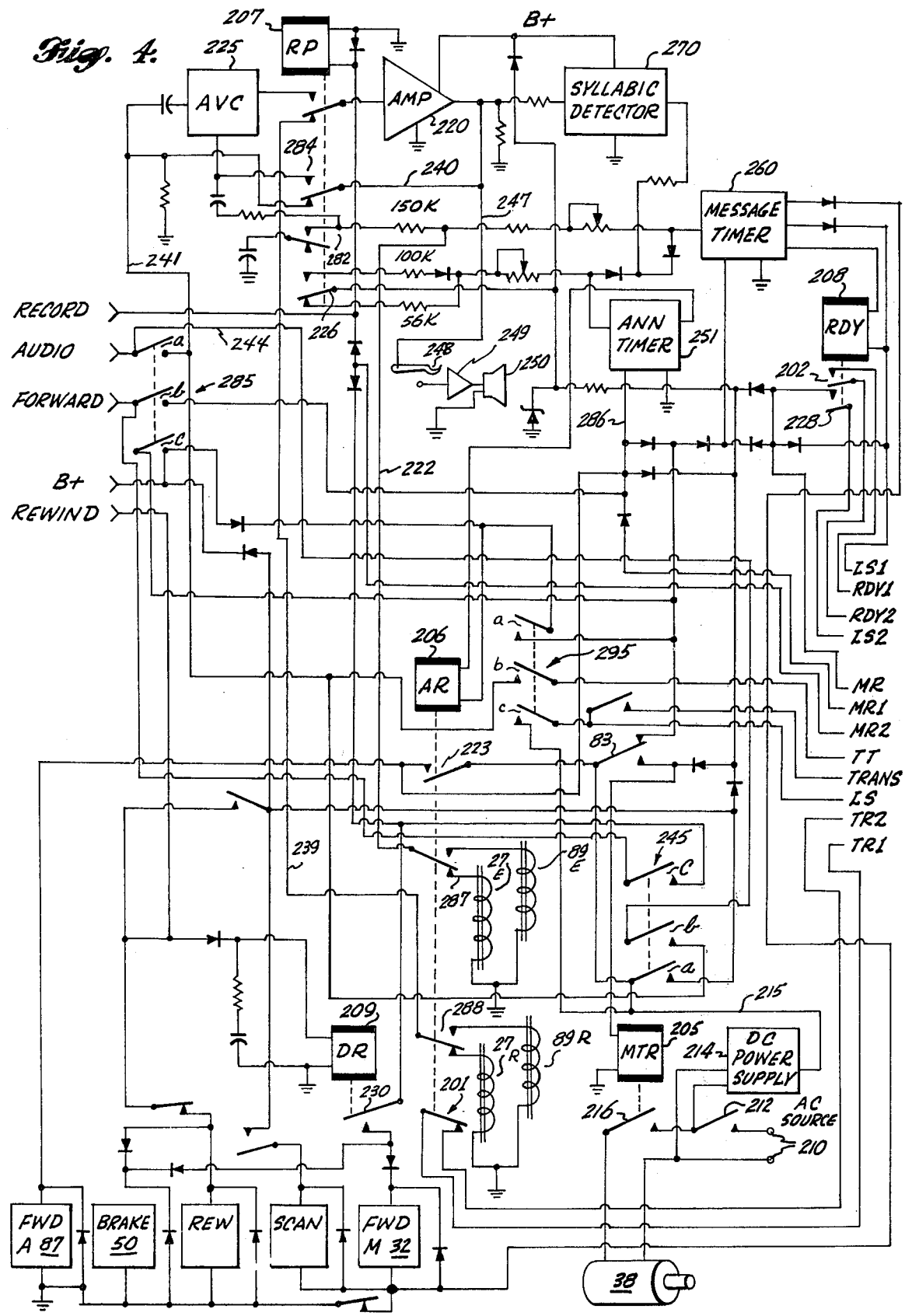

TELEPHONE ANSWERING DEVICE WITH SEPARATE ANNOUNCEMENT ERASE AND PLAYBACK CONTROL TIMING PERIODS

CROSS REFERENCES TO RELATED APPLICATIONS

This is a continuation of now-abandoned application Ser. No. 408,641, filed Oct. 23, 1973, which was a division of application Ser. No. 308,970, filed Nov. 24, 1972 and issued Sept. 3, 1974 as U.S. Pat. No. 3,833,186.

BACKGROUND OF THE INVENTION

1. Field of the Invention

This invention relates to telephone answering devices of the type utilized to reproduce a recorded announcement in response to an incoming call and for recording incoming messages after the announcement has ended.

2. Brief Description of the Prior Art

A number of different types of telephone answering devices are known in the prior art -- all providing some form of machine-based telephone answering service for a telephone subscriber. Typically, modern telephone answering devices include a pair of record/playback tape systems or decks, one being used for recording a telephone subscriber's announcement and reproducing it to a calling party, the other for recording callers' messages for playback at the subscriber's convenience. In more basic forms of such equipment, the announcement tape deck is provided with a mandatory, fixed-length announcement cycle which must be completed before the apparatus is switched over to record incoming messages. Such a system is both inefficient and inconvenient in that the subscriber must tailor his announcement to fit the fixed announcement cycle provided, which is typically much longer than the duration of the usual announcement.

More advanced forms of telephone answering equipment provide an announcement deck having an operating time period which is determined by the length of the outgoing announcement. In such devices, announcements of any desired length (up to the capacity of the tape deck) may be recorded. When the announcement is subsequently played out to a caller, the answering device switches into a message recording mode shortly after completion of the announcement, whatever its length, without obliging a caller to wait an inordinate length of time before beginning his message. One means recognized in the art for doing this is monitoring of the announcement tape for the presence of speech signals as the tape is played out to a caller. After an absence of such signals for a short interval, perhaps 3 seconds, the announcement tape is deactivated and the answering device is switched into its message recording mode.

While telephone answering devices having a variable length announcement cycle are a considerable improvement over the earlier-described type, certain problems may be encountered in their use. One such problem may arise when a subscriber replaces a previously recorded announcement with one which is somewhat shorter. Under certain circumstances, the remaining portion of the old announcement may be reproduced to a caller following the end of the new announcement -- a clearly undesirable situation.

SUMMARY OF THE INVENTION

A primary object of the present invention is to provide an improved automatic telephone answering device in which the above-mentioned problems are eliminated.

A more specific object of the invention is to provide a system for controlling the announcement tape in an automatic telephone answering device in a manner which assures that no portion of an old announcement will be played out to a caller following the reproduction of a replacement announcement.

A related object of the invention is to provide an automatic telephone answering device having an announcement tape system operable in multiple modes, including one mode for recording an announcement on the tape and another mode for reproducing the recorded announcement to a caller, and having timing means responsive to speech signals for deactuating the tape system a certain length of time following the end of an announcement when it is recorded and a second, shorter length of time following the announcement when it is reproduced.

The improved telephone answering device disclosed herein includes an announcement tape deck for recording a telephone subscriber's announcement and for reproducing it to a caller. Electrical and electromechanical circuitry is provided for controlling the announcement deck in certain of the device's operating modes which include announcement record, announcement reproduce, message record, message playback, etc.

A particular feature of the invention resides in the operation of the answering device in its announcement record and announcement reproduce modes (the latter also being referred to herein as the automatic answer-/announce mode). Thus, according to the invention, when a subscriber records an announcement on the announcement tape, the tape is allowed to continue running for a certain time period following completion of the announcement, completion being identified by the absence of human speech signals. However, when the announcement is reproduced or played out to a caller, the announcement deck is deactuated a second predetermined time interval after the announcement has concluded, which interval is shorter than the first-mentioned interval.

Other objects, advantages and features of the present invention will become apparent from the following description of a preferred embodiment of the invention, taken in conjunction with the accompanying drawings.

BRIEF DESCRIPTION OF THE DRAWINGS

FIG. 1 is a simplified perspective view of an announcement tape deck in a telephone answering device embodying the present invention;

FIG. 2 is a block diagram illustrating operation of the improved telephone answering device in announcement record mode;

FIG. 3 is a block diagram illustrating operation of the improved telephone answering device in announcement reproduce mode;

FIG. 4 is a schematic diagram of electrical and electromechanical control circuitry for the answering device;

FIG. 5 is a schematic diagram of circuitry in a handset portion of the device; and FIG. 6 is a schematic diagram showing portions of the FIG. 4 circuitry in greater detail.

DESCRIPTION OF PREFERRED EMBODIMENT

An improved telephone answering device embodying the present invention is described in detail in parent application Ser. No. 308,970, now U.S. Pat. No. 3,833,186, the disclosure of which is incorporated herein by reference. Thus, only those portions of the device necessary to an understanding of the present invention will be described herein.

Turning now to the drawings, announcement deck assembly 60 of the telephone answering device includes a mounting plate 61, a supply reel 62, and a take-up reel 63. Reels 62, 63 are mounted for free rotation on spindles 64, 65, respectively. Spindle 64 is fixed on mounting plate 61 by suitable means. Spindle 65 is fixed to a first end (hidden) of an arm 84 which is pivotally mounted on a post 85 fixed to mounting plate 61. The other end of arm 84 is connected to the working end 86 of an announcement forward solenoid, hereinafter designated FWD A solenoid, 87. FWD A solenoid 87 is secured to mounting plate 61 by a suitable mounting bracket. A tape guide post 88 is secured to mounting plate 61 adjacent an announcement record/erase head 89 secured by a mounting clip 90 to plate 61.

Supply reel 62 comprises an upper spool member 68 containing a quantity of recording tape 69. As is evident in the drawing, the free end portion of tape 69 passes behind guide post 88, across the curved face of announcement head 89, and is secured to take-up reel 63 by tape fastening peg 81. The actuator arm 82 of a double pole single throw rewind limit switch 83 is received between the upper and lower reel flange members of take-up reel 63.

Mechanical operation of the announcement deck is described in detail in above-mentioned U.S. Pat. No. 3,833,186. Summarizing briefly, however, the motion of a flywheel 40 in the answering device is transmitted by O-ring drive belt 45 to a lower cylindrical member 66 of supply reel 62. Member 66 is frictionally coupled to upper spool member 68 of the supply reel, thus providing a constant motion in the reverse or rewind tape direction. So long as FWD A solenoid 87 remains deactuated, the condition in which it is shown in FIG. 1, announcement tape 69 is rewound until taut, whereupon slippage occurs between upper spool member 68 and lower cylindrical member 66.

When FWD A solenoid 87 is energized by an appropriate signal, pivotal arm 84 forces take-up reel 63 into frictional engagement with a spindle 41 in flywheel 40, causing take-up reel 63 to be driven in the forward tape direction. The winding of tape on the hub of the take-up reel forces actuator arm 82 away from the hub, thereby throwing announcement rewind limit switch 83 to the opposite configuration. The forces due to the forward pull provided by take-up reel 63, and tape guide 88, in conjunction with the tape tension caused by the continual reverse rotation of lower cylindrical member 66 provides tension on the back of announcement tape 69 to engage the magnetic surface of the tape with the curved face of announcement head 89. Forward movement of announcement tape 69 continues in this manner until FWD A solenoid 87 is deenergized, whereupon the reverse motion provided by O-ring drive belt 45 again fully rewinds the announcement tape.

The just-described announcement tape deck is operable in two different modes which will now be described in conjunction with FIGS. 2 and 3. In announcement record mode, (FIG. 2) a transmitter in the handset portion of the telephone answering device is coupled through an automatic volume control circuit, (hereinafter AVC circuit) 225 and an amplifier 220 to announcement head 89 and through a syllabic detector 270 and an announcement timer 251 having a 6 second time-out, as described below. In this mode, a subscriber's announcement may be recorded on announcement tape 69.

In automatic answer/announce mode (FIG. 3) an announcement on tape 69 is coupled from announcement head 89 through amplifier 220 to a standard telephone coupler (or directly to a telephone line) and thence to the caller, and through syallabic detector 270 to announcement timer 251 having a 3 second time-out period. In this mode, a recorded announcement is reproduced in response to an incoming call, and the telephone answering device switched over by announcement timer 251 to record incoming messages.

FIG. 4 is a circuit diagram of the electromechanical control circuitry of the complete telephone answering device, except for the portion located in its telephone handset, that portion being shown in FIG. 5. As will be evident to those skilled in the art, the lettered connectors located at the extreme right center of FIG. 14 are adapted to be directly connected to a standard Bell coupler customarily used to connect so-called foreign devices to a line. The coupler forms no part of the present invention, and thus is not described herein for the sake of conciseness. Briefly, however, the standard Bell coupler has internal circuitry for performing the following switching functions. If power is present at the LS terminal, the Bell coupler initially connects LS to LS1. In response to an incoming call, the coupler switches LS from LS1 to LS2, LS2 to MR, MR to MR1, and the calling line to TT. If a pulse signal is thereafter provided to the coupler, as by closing a pair of contacts 201 and connecting terminal TR1 to TR2, the coupler switches MR from MR1 to MR2. If a second pulse signal is thereafter provided to the coupler, as by opening a pair of contacts 202, the coupler switches LS from LS2 to LS1 and MR from MR2 to MR1.

The circuit elements of FIG. 4 include five relays: motor relay 205, announcement relay 206, record/playback relay 207, ready relay 208, and delay relay 209, all having associated contacts as shown (the broken lines indicating mechanical interconnections). Power from an A.C. source is supplied to input terminals 210. When power switch 212 is closed, D.C. power supply 214, which may be a filtered full wave rectifier circuit, provides D.C. voltage of a suitable potential on lead 215.

Motor relay 205 controls operation of motor 38. When main power switch 212 is closed, and motor relay 205 is actuated, contacts 216 close, connecting motor 38 to A.C. terminals 210, energizing the motor.

Announcement relay 206 controls the switching configuration of announcement/record and erase sections 89R, 89E of announcement recording head 89, and message record and erase sections 27R, 27E of a mesage record/erase head 27, the latter sections being ordinarily connected to the input of amplifier 220 and to D.C. erase bias lead 222, respectively. Announcement relay 206 also controls contacts 201 used to provide the switching signal to coupler terminals TR1, TR2, as well as FWD A solenoid 87 via contacts 223.

Record/playback relay 207 controls the input to amplifier 220, AVC circuit 225 both of a known design, as well as the potential on D.C. erase bias lead 22, the latter via contact 226. Ready relay 208, used exclusively during automatic answer/announcement and automatic answer/record modes of operation furnishes D.C. power to several circuit elements via contact 228, as well as a switching signal coupler terminals RDY1, RDY2. Delay relay 209 is used to block actuation of FWD M solenoid 32 via contact 230 while the device's message tape is coasting to a stop in the rewind direction, as discussed in the above-mentioned patent.

Referring briefly to FIG. 5, it has been found desirable to provide for the initiation of certain control functions in the telephone answering device from its handset portion, and the circuit elements provided for this purpose in the handset are shown in FIG. 5. Handset receiver 232 and transmitter 233 are each coupled to an AUDIO terminal. The B+ is coupled with a signal pole double throw switch 234 to the junction of the anode of a silicon control rectifier 235 and two normally open single pole single throw switches 236, 237. Thus, by closing switch 236, B+ is connected to the FORWARD terminal and also to transmitter 233. By closing switch 237, silicon rectifier 235 is fired, providing B+ to the RECORD terminal. If switch 234 is thrown to the opposite configuration, B+ is supplied to the REWIND terminal and removed from the remaining terminals. All of the labeled terminals shown in FIG. 5 are coupled directly to the corresponding terminals shown at the left in FIG. 4.

Again referring to FIG. 4, amplifier 220 provides amplification for outgoing announcements and incoming messages in both the record and reproduce modes. For example, with announcement relay 206 and record/playback relay 207 contacts in the configuration shown, message record head 27R is coupled via input lead 239 through amplifier 220, and via leads 240, 241 to one side of portion 245b of a normally open switch 245. When this switch assembly is closed during the message playback mode of operation, messages record on the message tape are coupled through amplifier 220 to handset receiver 232 (FIG. 5).

An alternate audio output source for monitoring recorded announcements and messages is provided by lead 247, hook switch 248, speaker amplifier 249 and speaker 250. Hook switch 248 is normally mechanically biased to the open configuration shown, so that speaker amplifier 249 is disconnected whenever the handset is lifted from its cradle in the device. When the handset is replaced on the cradle, hook switch 248 is closed and speaker amplifier 249 is connected to the output of amplifier 220.

An important feature of the invention resides in the operation of announcement timer 251, message timer 260, and syllabic detector 270, the latter two circuits being shown in detail in FIG. 6. Syllabic detector 270 comprises a circuit for providing a low impedance to terminal 271 whenever human speech signals are present at input terminal 272. Basically, this circuit examines the modulation envelope of the input signal and passes only those envelope signals falling in the range of from 0 to about 10 cycles per second. If such signals are present, which is a known accurate condition for identifying the human speech signals, transistor 273 is turned on during the down slope portions of the signal pass. So long as transistor 273 is conducting, a low impedance path is provided from terminal 271 to ground.

Message timer 260, which is utilized to deactuate ready relay 208, includes a charging capacitor 261 which is charged from B+ via potentiometer 262 and coupled to the base of normally off transistor 263. For the sake of simplicity, ready relay 208 is shown directly coupled to B+, while in actuality this connection is made through the coupler via terminal LS1 and S circuit of FIG. 4.

A path through ready relay 208 to ground from B+ is provided by a transistor 264, which is initially turned on by B+ potential at terminal 265 coupled through resistor 266 to the base of this transistor. If transistor 264 is turned off, this path is interrupted and ready relay 208 is deactuated.

In operation, transistor 264 is initially turned on and capacitor 261 begins to charge. If human speech signals are applied to terminal 272 of syllabic detector 270, capacitor 261 is discharged via transistor 273. When human speech signals cease to be so applied -- e.g., after a message is completed -- capacitor 261 charges up uninterruptedly until the threshold potential required to turn on transistor 263 is reached. When transistor 263 turns on, the base of transistor 264 is coupled to ground potential, turning this transistor off and deactuating ready relay 208.

The actual time period between the cessation of the human speech signals and the deactuation of ready relay 208 is a function of the time constant the charging circuit including capacitor 261. This may be varied by adjusting potentiometer 262. In actual practice, a time period of about twelve seconds has been found to provide excellent results for message timer 260.

As shown in FIG. 4, announcement timer 251, which is used to control the deactuation of announcement relay 206, is also coupled to syllabic detector 270. The structure and operation of announcement timer 251 is substantially identical with that already described for message timer 260 with the following exceptions. In the automatic answer/announce mode, when a recorded announcement is being reproduced the charging current is supplied via record/playback relay contacts 226 and a first resistor, shown as having a value of 56 K ohms, in order to provide a first timing period of about three seconds. However, in announcement record mode, charging current is supplied via record/playback relay contacts 226 and a second greater value resistor, shown as having a value of 100 K ohms, in order to provide a second timing period of about 6 seconds. This longer period is provided to ensure that a sufficient portion of any previously recorded longer announcement on announcement tape 69 will be erased to prevent false operation during automatic answer/announce mode.

This may be best illustrated by assuming a previously recorded announcement of seventeen seconds duration on announcement tape 69. Assume now that it is replaced by a new announcement of thirteen seconds duration. During automatic answer/announce, the new announcement is reproduced. If the timer period were one second longer during automatic answer/announce than it was during recording of the new announcement, which in practice can result from line voltage fluctuations or circuit parameter changes, the unerased portion of the old announcement would be reproduced before the period lapsed. Absent the circuitry providing the longer, second timing period during announcement record, the unerased portion of the old announcement would then be reproduced to the caller. To eliminate this possibility, the longer, second timing period is provided, which guarantees a pause after the new announcement much greater than the maximum expected variation due to voltage fluctuations or variations in circuit parameters.

The operation of the telephone answering device during the announcement record and automatic answer/announcement (announcement reproduce) modes of operation will now be described. To enable operation of the announcement record mode, ganged switch assembly 285 is closed, coupling the handset AUDIO terminal to record/playback relay 207 contacts 284 via contacts 285a, coupling the handset FORWARD terminal to announcement timer 251 and FWD A solenoid 87 via contacts 285b, and coupling B+ to announcement relay 206 via contacts 285c. Since announcement timer 251 is not conditioned on terminal 286, announcement relay 206 is not actuated at this time.

Announcement record mode may now be initiated by closing handset RECORD switch 237, which actuates record/playback relay 207, and handset FORWARD switch 236, which conditions announcement timer 251 to provide a conductive path for announcement relay 206, thereby actuating this relay. Actuation of relay 207 provides B+ potential on D.C. bias lead 239 via relay contacts 282, and with relay 206 actuated, couples handset transmitter 233 via switch contacts 245b, AVC circuit 225, amplifier 220, and relay contacts 282 to announcement record head 89R. Closing of announcement relay contacts 223, energizes FWD A solenoid 87, and announcement tape 69 moves forward. Closing of announcement relay contacts 287, 288 connects the output of amplifier 220 to announcement record and erase sections 89R, 89E, respectively. An announcement may then be recorded. It is again noted that, in announcement record mode, announcement timer 251 is charged through the 100 K ohm resistor, providing the longer, six second time-out period. Thus, six seconds after the termination of the announcement, announcement timer 251 deactuates announcement relay 206, deenergizing FWD A solenoid 87 and disconnecting announcement head 89 from amplifier 220. Announcement tape 69 then rewinds automatically.

Automatic answer/announcement mode is enabled by closing ganged switch assembly 295. Closing of contacts 295a connects B+ to announcement relay 206. Closing of contacts 295b connects coupler terminal TT to record/playback relay 207 contacts. Closing of contacts 295c connects B+ to coupler terminal LS, which, it will be remembered, is connected by the coupler to LS1, thence to ready relay 208. Automatic answer/announce merit mode is initiated by an incoming call. In response to such a call, the coupler switches LS from LS1 to LS2 which conditions announcement timer 251, thereby actuating announcement relay 206. Actuation of announcement 206 connects announcement head 89 to the input of ampliifer 220, and then to the TT coupler terminals via contacts 295b, and also energizes FWD A solenoid 87 causing announcement tape 69 to move in the forward direction.

Transfer of LS to LS2 also provides B+ on MR1 and thence to motor relay 205 actuating this relay and starting the motor. B+ is also provided via MR1 to condition message timer 260 which causes actuation of ready relay 208.

With the motor running, the announcement tape moving in the forward direction and the announcement 89 coupled to coupler terminal TT, the recorded announcement is reproduced over the telephone line to the caller. Approximately 3 seconds after the termination of the announcement, announcement timer 251 deactuates announcement relay 206, thereby initiating an automatic message recording mode in the answering device. Approximately twelve seconds after the end of the message, message timer 260 deactuates ready relay 208, thereby closing ready relay contacts 202 which provides a second transfer signal for the coupler. Upon receipt of this signal, the coupler switches LS from LS2 to LS1 and MR from MR2 to MR1. The apparatus is now in the enable state for initiation of another automatic answer announcement cycle.

The improved telephone answering device which has been described above thus fulfills the various objectives stated earlier. According to the invention, when an announcement is recorded, the announcement tape is permitted to continue running for a certain time period, six seconds as exemplified herein, following the completion of the announcement, after which the announcement deck is deactuated, stopping the tape and permitting it to rewind. During the six second period, nothing is recorded on the tape, but any previous message is erased. Upon playing out the announcement in response to an incoming call, the announcement tape is permitted to continue running a somewhat shorter time period (3 seconds herein) before the announcement deck is deactuated. This assures that no portion of an old announcement on the tape will be accidentally reproduced to a caller.

While a particular embodiment of the invention has been shown and described, various modifications thereof would be apparent to those of skill in the art, and it is therefore not intended that the invention be limited to the disclosed embodiment or details thereof. Further, departures may be made therefrom within the spirit and scope of the invention as defined in the following claims.

What is claimed and desired to secure by letters patent is:

1. In a telephone answering device having an announcement tape, a first system for erasing an old announcement on the tape and for recording thereon a replacement announcement fed into the system, and a second system for playing back the tape and reproducing an announcement recorded thereon, the improvement comprising means in the first system responsive to the termination of the replacement announcement for erasing the tape for a predetermined time interval after the replacement announcement has terminated, and means in the second system for terminating playing back of the tape a predetermined time interval after the announcement has concluded, which interval is shorter than the first-mentioned time interval.

2. The telephone answering device of claim 1, wherein both means comprise syllabic detector means for identifying human speech signals characterizing said announcement.

* * * * *

UNITED STATES PATENT AND TRADEMARK OFFICE
CERTIFICATE OF CORRECTION

PATENT NO. : 4,032,712
DATED : June 28, 1977
INVENTOR(S) : Kenneth A. Catto; Harold R. Burt It is certified that error appears in the above-identified patent and that said Letters Patent are hereby corrected as shown below:

In the Title Page, (Page 1), No. 75 change "Beauertum" to --Beaverton--.

In Column 3, line 17 change "on" to --to--.

In Column 5, line 5 change "22" to -222--.

In Column 5, line 43 change "record" to --recorded--.

In Column 8, line 5 after "announcement" insert --head--.

Signed and Sealed this

Fourth Day of April 1978

[SEAL]

Attest:

RUTH C. MASON
Attesting Officer

LUTRELLE F. PARKER
Acting Commissioner of Patents and Trademarks